US006213213B1

(12) United States Patent
van Batenburg et al.

(10) Patent No.: US 6,213,213 B1
(45) Date of Patent: Apr. 10, 2001

(54) METHODS AND VISCOSIFIED COMPOSITIONS FOR TREATING WELLS

(75) Inventors: Diederik W. van Batenburg, Delft (NL); James M. McGowen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/415,521

(22) Filed: Oct. 8, 1999

(51) Int. Cl.$^7$ .................. E21B 43/22; E21B 43/26
(52) U.S. Cl. .................. 166/300; 166/308; 507/211; 507/215; 507/216; 507/217; 507/271; 507/277; 507/903; 507/921
(58) Field of Search .................. 166/294, 300, 166/308; 507/211, 215, 216, 217, 269, 271, 273, 275, 277, 902, 903, 921, 922; 516/122; 523/130

(56) References Cited

U.S. PATENT DOCUMENTS

| 3,167,510 | * | 1/1965 | Alter | 507/211 |
|---|---|---|---|---|
| 4,918,181 | * | 4/1990 | Karcher et al. | 536/114 |
| 5,054,552 | * | 10/1991 | Hall et al. | 166/300 X |
| 5,067,565 | | 11/1991 | Holtmyer et al. | 166/305.1 |
| 5,103,905 | * | 4/1992 | Brannon et al. | 166/300 X |
| 5,238,065 | * | 8/1993 | Mondshine et al. | 166/300 |
| 5,413,178 | | 5/1995 | Walker et al. | 166/300 |
| 5,420,174 | * | 5/1995 | Dewprashad | 523/130 |
| 5,460,226 | * | 10/1995 | Lawson et al. | 166/300 |
| 5,580,844 | * | 12/1996 | Swarup et al. | 507/921 X |
| 5,669,446 | | 9/1997 | Walker et al. | 166/300 |
| 5,669,447 | | 9/1997 | Walker et al. | 166/300 |
| 5,759,964 | * | 6/1998 | Shuchart et al. | 507/217 X |
| 5,911,923 | * | 6/1999 | Work et al. | 264/4.7 |
| 5,950,731 | * | 9/1999 | Shuchart et al. | 166/300 |

* cited by examiner

*Primary Examiner*—George Suchfield
(74) *Attorney, Agent, or Firm*—Robert A. Kent; C. Clark Dougherty, Jr.

(57) ABSTRACT

The present invention relates to methods of treating subterranean formations with viscosified aqueous well treating compositions which break into thin fluids at static temperatures in the range of from about 150° F. to about 200° F. A breaker system is included in the compositions comprised of an alkali metal or ammonium persulfate breaker and a breaker activity delaying agent comprised of an alkali metal chlorite or hypochlorite.

20 Claims, No Drawings

METHODS AND VISCOSIFIED COMPOSITIONS FOR TREATING WELLS

BACKGROUND OF THE INVENTION

1. Field of the Invention

The present invention relates to methods and compositions for treating subterranean well formations, and more specifically, to methods and viscosified compositions for fracture stimulating subterranean producing formations.

2. Description of the Prior Art

Producing subterranean formations penetrated by well bores are often treated to increase the permeabilities or conductivities thereof. One such production stimulation treatment involves fracturing the formation utilizing a viscous treating fluid. That is, the subterranean formation or a producing zone therein is hydraulically fractured whereby one or more cracks or "fractures" are produced therein. Fracturing may be carried out in wells which are completed in subterranean formations for virtually any purpose. The usual candidates for fracturing or other stimulation procedures are production wells completed in oil and/or gas containing formations. However, injection wells used in secondary or tertiary recovery operations, for example, for the injection of water or gas, may also be fractured in order to facilitate the injection of fluids into such subterranean formations.

Hydraulic fracturing is accomplished by injecting a viscous fracturing fluid into a subterranean formation or zone at a rate and pressure sufficient to cause the formation or zone to break down with the attendant production of one or more fractures. The fracture or fractures may be horizontal or vertical, with the latter usually predominating, and with the tendency toward vertical fracture orientation increasing with the depth of the formation being fractured. Usually a viscous aqueous gel, an emulsion or a foam having a proppant such as sand or other particulate material suspended therein is introduced into the fractures. The proppant is deposited in the fractures and functions to hold the fractures open after the pressure is released and the fracturing fluid flows back into the well. The fracturing fluid has a sufficiently high viscosity to retain the proppant in suspension or at least to reduce the tendency of the proppant to settle out of the fracturing fluid as the fracturing fluid flows into the created fracture. Generally, a viscosifier such as a polysaccharide gelling agent is used to gel an aqueous fracturing fluid to provide the high viscosity needed to realize the maximum benefits from the fracturing process.

After the high viscosity fracturing fluid has been pumped into the formation and fracturing of the formation has occurred, it is desirable to remove the fluid from the formation to allow hydrocarbon production through the created fractures. Generally, the removal of the highly viscous fracturing fluid is realized by "breaking" the gel or in other words, by converting the fracturing fluid into a low viscosity fluid. Breaking the gelled fracturing fluid has commonly been accomplished by adding a "breaker," that is, a viscosity-reducing agent, to the fracturing fluid prior to pumping it into the subterranean formation. However, this technique can be unreliable and sometimes results in incomplete breaking of the fluid, particularly when gel stabilizers are present, and/or premature breaking of the fluid before the fracturing process is complete.

U.S. Pat. No. 5,413,178 discloses the breaking of an aqueous gelled fracturing fluid or treatment fluid at a static temperature above 200° F. using an effective amount of an alkali metal chlorite or hypochlorite. The breaker is particularly effective in the static temperature range of 200° F. to about 300° F. However, it has been determined that alkali metal chlorites are generally ineffective as a breaker which functions within a reasonable time period at temperatures below about 200° F.

Alkali metal persulfates have been used heretofore as breakers for viscous well treating fluids at static temperatures above about 150° F. However, above about 180° F., the alkali metal persulfate breakers have been difficult to control and often result in premature breaking of the viscous fluids.

Another more recent breaker which has been used heretofore at static temperatures in the range of from about 180° F. to about 200° F. is comprised of an alkali metal chlorite or hypochlorite activated with an amine and/or copper ion. However, the use of copper ion in well treating solutions is prohibited in many countries.

Thus, there is a need for a treating fluid breaker which can be utilized to provide controlled breaks of viscosified fluids at static temperatures in the range of from about 150° F. to about 200° F.

SUMMARY OF THE INVENTION

The present invention relates to methods and compositions for treating subterranean formations or zones in wells wherein an aqueous fracturing fluid or other well treating fluid which has been viscosified with a polysaccharide is utilized at static temperatures in the range of from about 150° to about 200° F. and higher. The methods are basically comprised of injecting into the well and into contact with the zone to be treated an aqueous gelled fluid comprised of an aqueous liquid; a viscosity increasing amount of a gelling agent comprising at least one member selected from the group of galactomanans, modified or derivatized galactomanans and cellulose derivatives; a breaker comprising at least one non-encapsulated or encapsulated alkali metal persulfate or ammonium persulfate present in an amount sufficient to effect a reduction in viscosity of the fluid; and a breaker activity delaying agent comprised of at least one member selected from the group of alkali metal chlorites and hypochlorites present in an amount sufficient to delay the activity of said breaker and said reduction in viscosity for a predetermined period of time.

It is, therefore, a general object of the present invention to provide methods and viscosified compositions for treating wells.

Other and further objects, features and advantages of this invention will be readily apparent to those skilled in the art upon a reading of the description of preferred embodiments which follows.

DESCRIPTION OF PREFERRED EMBODIMENTS

The viscosifying or gelling agent employed in the present invention includes natural and derivatized polysaccharides which are soluble, dispersible or swellable in an aqueous liquid to yield viscosity to the liquid. One group, for example, of polysaccharides which are suitable for use in accordance with the present invention includes arabic gum, ghatti gum, karaya gum, tamarind gum, tagacanth gum, guar gum, locust bean gum and the like. Modified gums such as carboxyalkyl derivatives, like carboxymethyl guar, and hydroxyalkyl derivatives, like hydroxypropyl guar can also be employed. Doubly derivatized gums such as carboxymethylhydroxypropyl guar (CMHPG) can also be used.

Modified celluloses and derivatives thereof can also be employed in the practice of the present invention, for example, cellulose ethers, esters and the like. In general, any of the water-soluble cellulose ethers can be used. Those cellulose ethers include, among others, the various carboxyalkylcellulose ethers, such as carboxyethylcellulose and carboxymethylcellulose (CMC); mixed ethers such as carboxyalkylethers, e.g., carboxymethylhydroxyethylcellulose (CMHEC); hydroxyalkylcelluloses such as hydroxyethylcellulose (HEC) and hydroxypropylcellulose; alkyhydroxyalkylcelluloses such as methylhydroxypropylcellulose; alkylcelluloses such as methylcellulose, ethylcellulose and propylcellulose; alkylcarboxyalkylcelluloses such as ethylcarboxymethylcellulose; alkylalkylcelluloses such as methylethylcellulose; hydroxyalkylalkylcelluloses such as hydroxypropylmethylcellulose; and the like. A preferred derivatized cellulose is a hydroxyethylcellulose grafted with vinyl phosphonic acid such as disclosed in U.S. Pat. No. 5,067,565, issued to Holtmyer et al. on Nov. 26, 1991, the entire disclosure of which is incorporated herein by reference. The most preferred polysaccharides are the galactomanans, modified or derivative galactomanans, and cellulose derivatives, examples of which are given above.

The chemistry and materials involved in the preparation of polysaccharide gelled fluids of the type described above (often referred to as "Linear Gels") is well understood in the art. Typically, the amount of gelling or viscosifying agent employed in the aqueous gel depends upon the desired viscosity of the aqueous gel. The gelling agent generally is present in an amount of from about 10 to about 120 pounds per 1000 gallons of fluid. The preferred concentration is in the range of from about 15 to about 60 pounds per 1000 gallons of fluid.

The aqueous gel may include a cross-linking agent to further enhance the development of viscosity by cross-linking the gelling agent. The cross-linking agent can comprise a borate releasing compound or any of the well known transition metal ions which are capable of creating a cross-linked structure with the particular gelling agent utilized. Examples of such cross-linking agents include a borate releasing compound such as sodium tetraborate, aluminum, zirconium or titanium chelates, antimony compounds and the like. The cross-linking agent can be controlled to permit introduction of the aqueous gel into a well bore before the viscosity of the gel significantly increases.

The aqueous fluid utilized in the preparation of the gel often includes a salt such as potassium chloride to minimize the swelling of clays and the chances of damage to the subterranean formation upon contact with the fluid. The aqueous fluid may include any of the other conventional additives such as proppants, pH control agents, bactericides, clay stabilizers, surfactants and the like which do not adversely react with the other components of the aqueous gel to inhibit performance of the desired treatment upon a subterranean formation.

The water soluble breaker system for the gelled fluid of this invention includes a gel breaker comprised of an effective amount of at least one non-encapsulated or encapsulated compound selected from the group consisting of alkali metal or ammonium persulfates and an effective amount of a breaker activity delaying agent comprised of at least one compound selected from the group consisting of alkali metal chlorites or hypochlorites. Surprisingly, the chlorite or hypochlorite in the breaker system does not function as a breaker, but instead, it prevents the alkali metal persulfate from functioning as a breaker for a predetermined period of time. As mentioned, the breaker can be encapsulated with a slowly water dissolvable material or the like when necessary to increase the delay before the gelled fluid breaks.

The amount of persulfate breaker employed is that amount required to reduce the viscosity of the gelled fluid at a static temperature in the range of from about 150° F. to about 200° F. or higher to a preselected lower viscosity or to a complete break. The amount of the chlorite or hypochlorite breaker activity delaying agent employed is that amount required to delay the activity of the breaker and the reduction in viscosity caused thereby for a predetermined period of time.

The optimum or effective amount of the alkali metal or ammonium persulfate breaker employed in accordance with the present invention depends on factors such as the particular gelling agent and its concentration, the particular cross-linking agent employed, if any, the formation temperature and other factors. Typically, however, in the range of from about 0.01 to about 50 pounds of the alkali metal or ammonium persulfate breaker is employed per 1000 gallons of gelled fluid. Preferably, the alkali metal persulfate breaker is sodium persulfate present in an amount in the range of from about 0.1 to about 20 pounds per 1000 gallons of gelled fluid.

The amount of breaker activity delaying agent employed, i.e., alkali metal chlorite or hypochlorite, is that amount required to delay the gel breaking activity of the persulfate breaker for a predetermined period of time greater than about one half hour within the static temperature range of from about 150° F. to about 200° F. Typically, the breaker activity delaying agent is present in an amount in the range of from about 0.01 to about 50 pounds per 1000 gallons of fluid. Preferably, the breaker activity delaying agent is sodium chlorite present in an amount in the range of from about 0.1 to about 20 pounds per 1000 gallons of gelled fluid.

In order to further illustrate the methods and compositions of this invention, the following examples are given.

EXAMPLE

Static break tests were performed to evaluate the break capabilities of the breaker system of this invention in an aqueous linear gel. The aqueous gel was prepared by adding hydroxypropylguar gelling agent to fresh water in an amount of 35 pounds per 1000 gallons of water. The aqueous gel formed was cross-linked with ulexite which was added to the gel in an amount of about 8 pounds per 1000 gallons of the gel. Various quantities of a breaker activity delaying agent of this invention, i.e., sodium chlorite, along with various quantities of a sodium persulfate breaker were added to samples of the gel as shown in the Table below. The break tests were performed at a temperature of 180° F. and consisted of observing the aqueous gel over a 24 hour time period. The results of these tests are given in Table I below.

TABLE

Cross-Linked Linear Gel Break Tests

| Sample No. | Breaker Activity Delaying Agent[1], pounds per 1000 gallons | Persulfate Breaker[2], pounds per 1000 gallons | Status of Cross-Linked Gel Over Time | | | | | | | | |
|---|---|---|---|---|---|---|---|---|---|---|---|
| | | | 0.5 hr | 1 hr | 1.5 hr | 2 hr | 2.5 hr | 3 hr | 4 hr | 5 hr | 24 hr |
| 1 | 0 | 1 | C[3] | BR[4] | BR | BR | BR | BR | BR | BR | BR |
| 2 | 1 | 1 | C | WC[5] | BR | BR | BR | BR | BR | BR | BR |
| 3 | 5 | 1 | C | C | C | WC | VWC[6] | BR | BR | BR | BR |

[1]Sodium chlorite
[2]Sodium persulfate
[3]C means cross-linked
[4]BR means broken
[5]WC means weakly cross-linked
[6]VWC means very weakly cross-linked From the above Table, it can be seen that sodium chlorite functions as a breaker activity delaying agent when used in combination with sodium persulfate breaker, and that by increasing or decreasing the quantity of sodium chlorite utilized, the break time can be increased or decreased.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of treating a zone of a subterranean formation penetrated by a well bore wherein the static temperature of the zone is above about 150° F. comprising injecting into the well bore and into contact with said zone an aqueous gelled fluid comprised of an aqueous liquid, a viscosity increasing amount of a gelling agent comprising at least one member selected from the group consisting of galactomanans, modified or derivatized galactomanans and cellulose derivatives, a breaker comprising at least one member selected from the group consisting of alkali metal and ammonium persulfates present in an amount sufficient to effect a reduction in the viscosity of said fluid and a breaker activity delaying agent comprised of at least one member selected from the group consisting of alkali metal chlorites and hypochlorites present in an amount sufficient to delay the activity of said breaker and said reduction in viscosity for a predetermined period of time.

2. The method of claim 1 wherein said breaker is present in an amount in the range of from about 0.01 to 50 pounds per 1000 gallons of fluid.

3. The method of claim 1 wherein said breaker activity delaying agent is present in an amount in the range of from about 0.01 to about 50 pounds per 1000 gallons of fluid.

4. The method of claim 1 wherein said gelling agent comprises at least one member selected from the group consisting of guar, hydroxypropylguar, carboxymethylhydroxypropylguar, carboxymethylhydroxyethylcellulose, carboxymethylcellulose and hydroxyethylcellulose grafted with vinyl phosphonic acid.

5. The method of claim 1 wherein said aqueous fluid further comprises a cross-linking agent including at least one member selected from the group consisting of borate-releasing compounds, a source of titanium ions, a source of zirconium ions, a source of antimony ions and a source of aluminum ions.

6. The method of claim 1 wherein said zone has a static temperature of from about 150° F. to about 200° F.

7. A method of fracturing a zone of a subterranean formation penetrated by a well bore wherein the static temperature of the formation adjacent said well bore is above about 150° F., comprising injecting into the well bore and into contact with the formation at a rate and pressure sufficient to fracture the formation an aqueous fluid comprising:
    (a) an aqueous liquid;
    (b) a gelling agent comprising at least one member selected from the group consisting of galactomanans, modified or derivatized galactomanans, and cellulose derivatives present in an amount sufficient to increase the viscosity of said aqueous liquid;
    (c) a cross-linking agent present in an amount sufficient to effect cross-linking of said gelling agent in said aqueous liquid to further increase the viscosity of said aqueous liquid.
    (d) a breaker comprising at least one member selected from the group consisting of alkali metal and ammonium persulfates present in an amount sufficient to effect a reduction in the viscosity of the cross-linked gelling agent in the aqueous liquid; and
    (e) a breaker activity delaying agent comprised of at least one member selected from the group consisting of alkali metal chlorites and hypochlorites present in an amount sufficient to delay the activity of said breaker and said reduction in viscosity for a predetermined period of time.

8. The method of claim 7 wherein said breaker is present in an amount in the range of from about 0.01 to about 50 pounds per 1000 gallons of fluid.

9. The method of claim 7 wherein said breaker activity delaying agent is present in an amount in the range of from about 0.01 to about 50 pounds per 1000 gallons of fluid.

10. The method of claim 7 wherein said zone has a static temperature of from about 150° F. to about 200° F.

11. The method of claim 7 wherein said gelling agent comprises at least one member selected from the group consisting of guar, hydroxypropylguar, carboxymethylhydroxypropylguar, carboxymethylhydroxyethylcellulose, carboxymethylcellulose and hydroxyethylcellulose grafted with vinyl phosphonic acid.

12. The method of claim 7 wherein said cross-linker comprises at least one member selected from the group consisting of borate-releasing compounds, a source of titanium ions, a source of zirconium ions, a source of antimony ions and a source of aluminum ions.

13. An aqueous gelled composition for use as a treating fluid in a zone of a subterranean formation which breaks into a low viscosity fluid at a temperature from about 150° F. to about 200° F. after a time period of greater than about 0.5 hours comprising:
- an aqueous liquid;
- a viscosity increasing amount of a gelling agent comprising at least one member selected from the group consisting of galactomanans, modified or derivatized galactomanans and cellulose derivatives;
- a breaker comprising at least one member selected from the group consisting of alkali metal and ammonium persulfates; and
- a breaker activity delaying agent comprised of at least one member selected from the group consisting of alkali metal chlorites and hypochlorites present in an amount sufficient to delay the activity of said breaker for a predetermined period of time.

14. The composition of claim 13 wherein said breaker is present in an amount in the range of from about 0.01 to about 50 pounds per 1000 gallons of said composition.

15. The composition of claim 13 which said breaker activity delaying agent is present in an amount in the range of from about 0.01 to about 50 pounds per 1000 gallons of said composition.

16. The composition of claim 13 wherein said gelling agent comprises at least one member selected from the group consisting of guar, hydroxypropylguar, carboxymethylhydroxypropylguar, carboxymethylhydroxyethylcellulose, carboxymethylcellulose and hydroxyethylcellulose grafted with vinyl phosphonic acid.

17. The composition of claim 13 which further comprises a cross-linking agent including at least one member selected from the group consisting of borate-releasing compounds, a source of titanium ions, a source of zirconium ions, a source of antimony ions and a source of aluminum ions.

18. The composition of claim 13 wherein said zone has a static temperature of from about 150° F. to about 200° F.

19. The composition of claim 17 wherein said breaker is sodium persulfate present in an amount in the range of from about 0.1 to about 20 pounds per 1000 gallons of said composition.

20. The composition of claim 14 wherein said breaker activity delaying agent is sodium chlorite present in an amount in the range of from about 0.1 to about 20 pounds per 1000 gallons of said composition.

* * * * *